US005694332A

United States Patent [19]

Maturi

[11] Patent Number: 5,694,332

[45] Date of Patent: Dec. 2, 1997

[54] MPEG AUDIO DECODING SYSTEM WITH SUBFRAME INPUT BUFFERING

[75] Inventor: Greg Maturi, Tracy, Calif.

[73] Assignee: LSI Logic Corporation, Milpitas, Calif.

[21] Appl. No.: 358,021

[22] Filed: Dec. 13, 1994

[51] Int. Cl.$^6$ ........................................ H04L 5/14

[52] U.S. Cl. ........................................ 364/514 C; 360/40

[58] Field of Search ........................ 364/514 R, 514 C, 364/715.02; 370/92, 93, 60; 360/39, 40; 348/48, 407, 17; 395/114, 115, 154, 250, 425, 163; 382/56

[56] References Cited

U.S. PATENT DOCUMENTS

| | | | |
|---|---|---|---|
| 4,394,774 | 7/1983 | Widergren et al. | 382/250 |
| 4,660,079 | 4/1987 | Devimeux et al. | 358/141 |
| 5,202,761 | 4/1993 | Cooper | 358/149 |
| 5,351,090 | 9/1994 | Nakamura | 348/484 |
| 5,351,092 | 9/1994 | Poimboeuf et al. | 348/512 |
| 5,386,233 | 1/1995 | Keith | 348/407 |
| 5,446,839 | 8/1995 | Dea et al. | 395/163 |

*Primary Examiner*—Emanuel T. Voeltz
*Assistant Examiner*—Thomas Peeso
*Attorney, Agent, or Firm*—Poms, Smith, Lande & Rose, PC

[57] ABSTRACT

A Motion Picture Experts Group (MPEG) video/audio data bitstream comprises frames of encoded audio data, each of which includes a plurality of integrally encoded subframes, which are decoded by an audio decoder for presentation. An input buffer arrangement includes first and second buffer memories which each have a capacity to store one subframe. The first and second buffer memories are used alternatingly, with one storing a subframe of input data while another subframe is being read out of the other. A third buffer memory, which has a capacity to store at least one subframe, is provided upstream of the first and second buffer memories to prevent the first and second buffer memories from overflowing or underflowing.

29 Claims, 2 Drawing Sheets

MPEG AUDIO DECODING SYSTEM WITH SUBFRAME INPUT BUFFERING

BACKGROUND OF THE INVENTION

1. Field of the Invention

The present invention generally relates to the art of audio/video data compression and transmission, and more specifically to a Motion Picture Experts Group (MPEG) audio/video decoding system including subframe input buffers.

2. Description of the Related Art

Constant efforts are being made to make more effective use of the limited number of transmission channels currently available for delivering video and audio information and programming to an end user such as a home viewer of cable television. Various methodologies have thus been developed to achieve the effect of an increase in the number of transmission channels that can be broadcast within the frequency bandwidth that is currently allocated to a single video transmission channel. An increase in the number of available transmission channels provides cost reduction and increased broadcast capacity.

The number of separate channels that can be broadcast within the currently available transmission bandwidth can be increased by employing a process for compressing and decompressing video signals. Video and audio program signals are converted to a digital format, compressed, encoded and multiplexed in accordance with an established compression algorithm or methodology.

The compressed digital system signal, or bitstream, which includes a video portion, an audio portion, and other informational portions, is then transmitted to a receiver. Transmission may be over existing television channels, cable television channels, satellite communication channels, and the like.

A decoder is provided at the receiver to de-multiplex, decompress and decode the received system signal in accordance with the compression algorithm. The decoded video and audio information is then output to a display device such as a television monitor for presentation to the user.

Video and audio compression and encoding is performed by suitable encoders which implement a selected data compression algorithm that conforms to a recognized standard or specification agreed to among the senders and receivers of digital video signals. Highly efficient compression standards have been developed by the Moving Pictures Experts Group (MPEG), including MPEG 1 and MPEG 2. The MPEG standards enable several VCR-like viewing options such as Normal Forward, Play, Slow Forward, Fast Forward, Fast Reverse, and Freeze.

Audio data is provided in the form of frames which are decoded and presented or played at a constant rate which is synchronized with the video presentation. However, depending on the degree of compression of the various frames, the encoded data may arrive at the decoder at a rate which is instantaneously faster or slower than the rate at which the data is being output from the decoder.

Means must therefore be provided to buffer the input data and compensate for instantaneous differences in input and output rate. The obvious, prior art solution is to provide two buffer memories, each having the capacity to store one frame of input data, and alternatingly store one frame of data in one buffer memory while reading out and decoding data from the other buffer memory, and vice-versa. In other words, the buffer memories are toggled back and forth between read and write operations, with one being written to while the other is being read from, and vice-versa.

Although simple to implement in principle, this scheme is disadvantageous in that it requires a large buffer memory capacity. An MPEG Layer II audio frame, for example, consists of 13,824 bits of data, so that the buffer memory capacity for storing two complete frames is 27,648 bits. This is excessive in terms of size, cost and complexity in an application in which, for example, an entire MPEG decoder must be implemented on a single integrated circuit chip.

SUMMARY OF THE INVENTION

The present system fills a need that has existed in the art by providing a Motion Picture Experts Group (MPEG) audio decoding system with greatly reduced input buffer requirements compared to the prior art.

The present invention exploits the fact that an MPEG audio frame comprises 12 subframes of integrally encoded data, and that it is possible to decode MPEG audio data using buffer memories that store subframes of audio data, rather than entire frames as in the prior art.

In accordance with the present invention, an input buffer arrangement includes first and second buffer memories which each have a capacity to store one subframe. The first and second buffer memories are used alternatingly, with one storing a subframe of input data while another subframe is being read out of the other.

A third buffer memory, which has a capacity to store at least one subframe, is provided upstream of the first and second buffer memories to prevent the first and second buffer memories from overflowing or underflowing.

These and other features and advantages of the present invention will be apparent to those skilled in the art from the following detailed description, taken together with the accompanying drawings, in which like reference numerals refer to like parts.

DETAILED DESCRIPTION OF THE INVENTION

Figure 1:
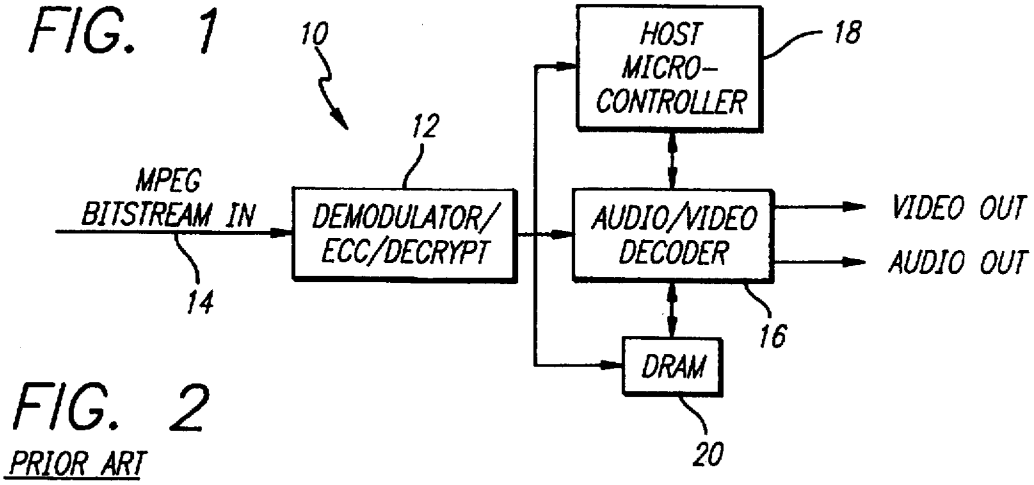
FIG. 1 is a block diagram illustrating a video/audio decoder comprising an audio decoding system according to the present invention.

A video/audio decoder system 10 embodying the present invention is illustrated in FIG. 1. The decoder 10 comprises a demodulator/ECC/decryptation unit 12 for receiving an MPEG multiplexed bitstream from an encoder (not shown) via a communications channel 14. The unit 12 demodulates the input bitstream, performs error correction (ECC), and de-encrypts the demodulated data if it is encrypted for access limitation or data compression purposes.

The unit 12 applies the demodulated MPEG bitstream as digital data to a video/audio decoder 16, which de-multiplexes and decodes the bitstream to produce output video and audio signals in either digital or analog form.

The system 10 further comprises a host microcontroller 18 that interacts with the decoder 16 via an arrangement of interrupts. The decoder 16 and the microcontroller 18 have access to an external data storage such as a Dynamic Random Access Memory (DRAM) 20. It will be noted that the scope of the invention is not so limited, however, and that the memory 20 can be provided inside the decoder 16 or the microcontroller 18.

Figure 2:
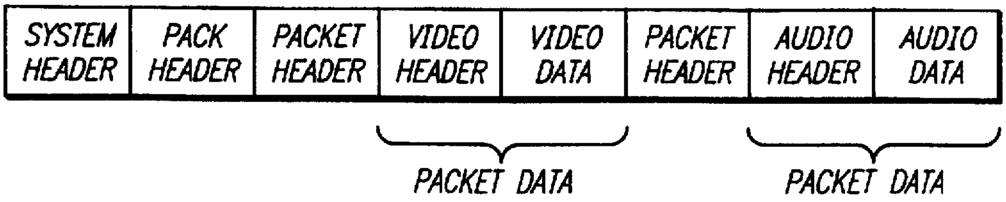
FIG. 2 PRIOR ART
FIG. 2 is a simplified diagram illustrating a Motion Picture Experts Group (MPEG) data bitstream that is decoded by the decoder of FIG. 1.

A simplified, generic representation of an MPEG bitstream is illustrated in FIG. 2. The bitstream includes a system header that provides housekeeping and other information required for proper operation of the decoder 16. A pack header identifies a pack of data that comprises one or more packs, with each pack having a pack header. Each pack includes one or more video and/or audio access units (encoded frames), each of which is preceded by its own header having a frame Start Code (SC).

The MPEG system syntax governs the transfer of data from the encoder to the decoder. A system stream typically comprises a number of Packetized Elementary Streams (PES), which can be video or audio streams, that are combined together to form a program stream. A program is defined as a set of elementary streams which share the same system clock reference, so can be decoded synchronously to each other.

In MPEG 1 there are only two levels of hierarchy in the system syntax; the elementary stream and the program stream. In MPEG 2 there are more levels.

Figure 3:
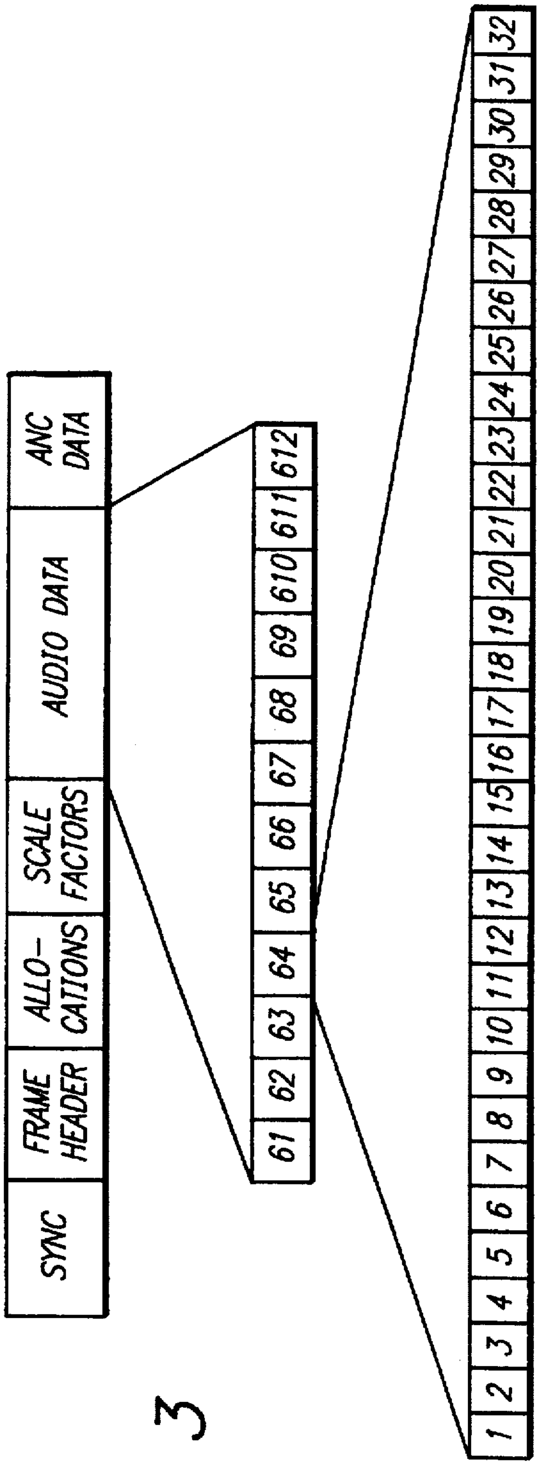
FIG. 3 PRIOR ART
FIG. 3 is a diagram illustrating a frame of audio data of the bitstream of FIG. 2.

An audio presentation unit or frame is illustrated in FIG. 3, and comprises a synchronization code (typically "FFF" in the hexadecimal notation system), followed by a frame header that specifies "side" information including the bitrate, sampling rate and the MPEG layer (I, II or III) that was used for encoding. This is followed by an allocation section, which specifies the numbers of bits used to code respective subband samples, and a scale factor by which decoded audio samples are to be multiplied.

The actual data is encoded in the form of subframes or groups that follow the scale factor designation, with ancillary data optionally following the data subframes.

The present invention will be described with reference to the Layer I encoding protocol of the MPEG specification. However, the invention is not limited, and can be applied to Layer II and III protocols, as well as to encoding schemes other than MPEG.

According to the Layer I encoding scheme, each audio frame comprises 12 subframes that are identified as G1 to G12 in FIG. 3. Each subframe G1 to G12 includes 32 subband samples of audio data that are designated by the numerals 1 to 32 respectively in FIG. 3, such that each frame includes 12×32=384 subband samples.

The method of encoding the subband samples is not the particular subject matter of the present invention and will not be described in detail. In general, 32 audio data samples are taken in the time domain, and converted into 32 subband samples in the frequency domain using matrixing operations in accordance with the Discrete Cosine Transform algorithm.

A separate scale factor is specified for each group or subframe of 32 subband samples. Due to the integrally encoded nature of each group of 32 subband samples, the subframe is the smallest unit of audio data that can be decoded independently.

Figure 4:
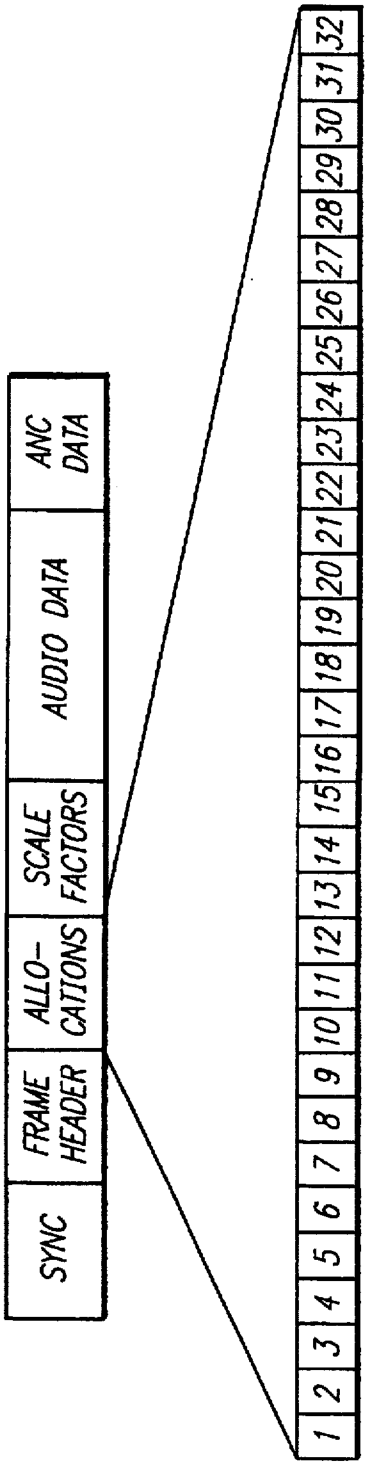
FIG. 4 PRIOR ART
FIG. 4 is a diagram illustrating allocation data of the bitstream of FIG. 2.

The MPEG specification also allows the 32 subband samples that constitute each subframe to be quantized using different numbers of bits. As illustrated in FIG. 4, the allocation section of the audio frame includes 32 4-bit numbers or values that are designated by the reference numerals 1 to 32, and specify the number of bits used to quantize the 32 audio subband samples respectively.

This information is advantageously used by the present invention to calculate the number of bits in each subframe. In accordance with the MPEG specification, each subframe or group of 32 subband samples has the same length (number of bits), with the number of bits being equal to the sum of the allocation values. In other words, the number of bits per subframe can be calculated by adding together or summing the 32 allocation values for the 32 respective subbands in the allocation section of the audio frame header.

Figure 5:
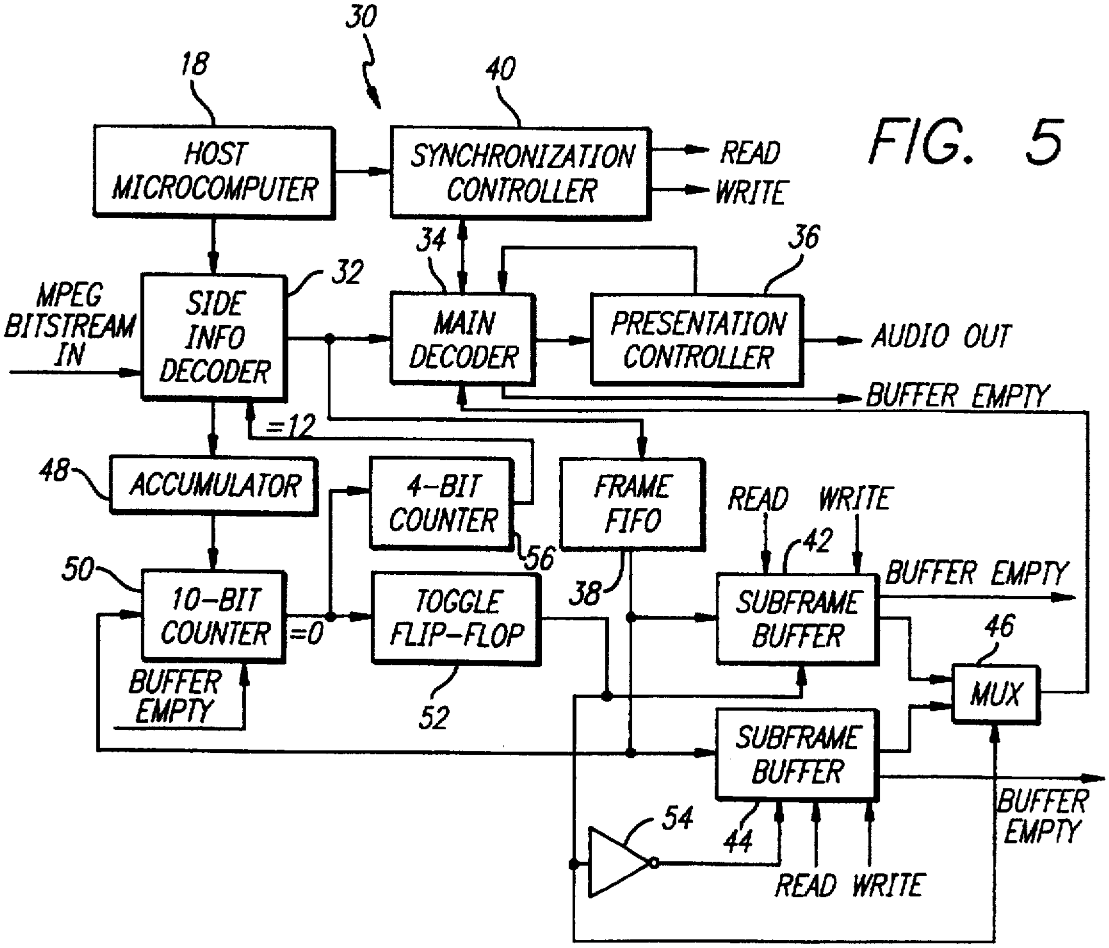
FIG. 5 is a block diagram illustrating the present audio decoding system.

An audio decoding system 30 which is part of the audio/video decoder 16 is illustrated in FIG. 5. The present system 30 includes a pre-parser or side information decoder 32 which parses and decodes the side information in each audio frame header as illustrated in FIGS. 3 and 4 to obtain the bitrate, sampling rate, allocation values, and other information for each frame.

The decoder 32 passes the side information to a main decoder 34 which decodes the subframes of audio data (access units AU) to produce decoded presentation units (PU) that are applied to a presentation controller 36 for presentation or playing.

The audio subframes are parsed and applied from the decoder 32 to a frame buffer memory 38 which has the capacity to store at least one audio subframe. The minimum required capacity for the memory 38 is one subframe, although it is within the scope of the invention to provide the memory 38 with a capacity for storing more than one subframe of data. The memory 38 does not have to have a capacity that is an integral number of subframes of data, and can, for example, store 2.5 subframes of data.

The memory 38 is preferably a circular First-In-First-Out (FIFO) unit, having a write pointer and a read pointer which, although not explicitly illustrated, are controlled by a synchronization controller 40. The subframes are generally stored asynchronously in the memory 38 as received, with the write pointer being automatically incremented. Subframes are read out of the memory 38 from the location of the read pointer as required by the synchronization of the decoding operation.

The output of the frame memory 38 is alternatingly applied to inputs of first and second subframe buffer memories 42 and 44. Data is alternatingly read out of the memories 42 and 44 and decoded by the decoder 34 for presentation by the presentation controller 36. The outputs of the memories 42 and 44 are alternatingly applied to the decoder 34 through a multiplexer 46.

The system 30 is operated such that one audio subframe is read out of one of the memories 42 and 44 while the next audio subframe is being written into or stored in the other of the memories 42 and 44. The operation is then toggled such that an audio subframe is read out of the memory 42 or 44 that was previously used in write mode, whereas another audio subframe is stored in the memory that was previously used in read mode. The operation is thereby switched or toggled for each subframe, with the memories 42 and 44 being used alternatingly for reading and writing subframes of data.

The present invention enables MPEG audio data to be decoded using a buffer memory arrangement with greatly reduced capacity compared to the prior art. Whereas the conventional buffering arrangement requires 2 buffer memories, each of which is capable of storing a complete audio frame (total 24 subframes), the present invention requires a buffer capacity of only 3 subframes. Thus, the present invention is able to perform audio decoding using a buffer arrangement having a capacity of 3/24=0.125 of the capacity required in the prior art.

In operation, the side information decoder 32 decodes and parses the sampling rate, bitrate, system clock references (SCR) and presentation time stamps (PTS) in the frame headers, and feeds this information to the host microcomputer 18 and to the decoder 34 for synchronization of the decoding and presentation timing of the input data. This operation is not the particular subject matter of the present invention and will not be described in detail.

The decoder 32 also parses the allocation values from the frame headers, and feeds these values to an accumulator 48 which adds together or sums the allocation values to compute the number of bits in each audio subframe as described above with reference to FIG. 4. In response to a reset condition as indicated by a BUFFER EMPTY signal, this number of bits is loaded into a counter 50. The capacity of the counter 50 is preferably 10 bits, enabling a maximum count or subframe bit length of 1024 bits, although the invention is not limited to any particular value.

The audio bitstream is applied from the memory 38 to a count-down (decrement) input of the counter 50, which is decremented by each bit of subframe audio data that is being stored or written into one of the memories 42 and 44. Concurrently, a subframe of data is being read out of the other of the memories 42 and 44 and decoded as described above.

When the count in the counter 50 reaches zero, indicating that a subframe of data has been stored in the memory 42 or 44, the counter 50 produces an output signal which is applied to a toggle flip-flop 52. The output of the flip-flop 52 is applied directly to the memory 42, and through an inverter 54 to the memory 44 to provide opposite logical sense. This causes the memories 42 and 44 to toggle mode. The memory 42 or 44 that was previously in read mode is toggled to write mode, and the memory 42 or 44 that was previously in write mode is toggled to read mode.

The operation continues, with the next audio subframes being stored and decoded for presentation. The zero output of the counter 50 is also applied to a 4-bit counter 56, which produces an output signal when the count therein become equal to 12. This indicates that 12 subframes, or an entire frame of audio data, has been decoded and presented. The output signal from the counter 56 is applied to the decoder 32 to indicate that the decoder 32 should search for the beginning of the next frame of audio data.

The synchronization controller 40 is responsive to the operation of the decoder 34, and produces buffer READ and WRITE signals that constitute read and write pointers respectively for the memories 42 and 44. The BUFFER EMPTY signal can be produced by the decoder 34, or alternatively by the buffers 42 and 44 upon completion of decoding a subframe, to cause the counter 50 to load the number of bits per subframe from the accumulator 48.

In summary, the present system fills a need that has existed in the art by providing a Motion Picture Experts Group (MPEG) audio decoding system with greatly reduced input buffer requirements compared to the prior art.

Various modifications will become possible for those skilled in the art after receiving the teachings of the present disclosure without departing from the scope thereof.

I claim:

1. A decoding system for decoding a data bitstream including frames of data, each frame including a plurality of subframes of integrally encoded data, comprising:

a first buffer memory having a capacity for storing at least one subframe;

a second buffer memory having a capacity for storing at least one subframe;

controller means for alternatingly storing subframes in the first buffer memory and the second buffer memory; and decoding means for reading out and decoding a subframe from the first buffer memory while the controller means stores a subframe in the second buffer memory, and reading and decoding a subframe from the second buffer while a subframe is being stored in the first buffer memory.

2. A system as in claim 1, further comprising a third buffer memory disposed upstream of the first and second buffer memories.

3. A system as in claim 2, in which the third buffer memory has a capacity for storing at least one subframe.

4. A system as in claim 1, in which the controller means comprises:

computing means for computing a number of bits in one subframe;

counting means for counting bits of said bitstream; and toggling means for toggling the first buffer memory between a read mode and a write mode and toggling the second buffer memory between said write mode and said read mode respectively in response to the counter means counting said number of bits.

5. A system as in claim 4, in which:

the counting means loads said number of bits from the computing means in response to a reset condition, and is decremented by counting said bits; and the toggling means toggles the first and second buffer memories in response to the counting means being decremented to zero.

6. A system as in claim 5, in which each of the first and second buffer memories generates said reset condition in response to a subframe being read out thereof by the decoding means.

7. A system as in claim 5, in which the decoding means generates said reset condition in response to completion of decoding a subframe.

8. A system as in claim 4, in which:

each frame of data further includes information indicating said number of bits; and the computing means computes said number of bits from said information.

9. A system as in claim 4, in which:

said bitstream is an MPEG bitstream, comprising a header for each frame including audio subband allocation data; and the computing means computes said number of bits from said subband allocation data.

10. A system as in claim 9, in which the computing means comprises:

header decoding means for decoding said header to obtain said subband allocation data; and summing means for summing said subband allocation data to obtain said number of bits.

11. A system as in claim 1, in which the first and second buffer memories each have a capacity for storing no more than one subframe.

12. A method of decoding an MPEG bitstream including frames of data, each frame including a plurality of subframes of integrally encoded audio subband sample data, comprising the steps of:

(a) providing a first buffer memory having a capacity for storing at least one subframe;

(b) providing a second buffer memory having a capacity for storing at least one subframe;

(c) alternatingly storing substantially one subframe at a time in the first buffer memory and the second buffer memory; and (d) reading out and decoding a subframe from the first buffer memory while a subframe is being stored in the second buffer memory, and reading and decoding a subframe from the second buffer while a subframe is being stored in the first buffer memory.

13. A method as in claim 12, further comprising the step, performed prior to step (c), of:

(e) providing a third buffer memory upstream of the first and second buffer memories; and (f) using the third buffer memory to accumulate said data.

14. A method as in claim 13, in which step (e) comprises providing the third buffer memory as having a capacity for storing at least one subframe.

15. A method as in claim 12, in which step (c) comprises the substeps of:

(e) computing a number of bits in one subframe;

(f) counting bits of said bitstream; and (g) toggling the first buffer memory between a read mode and a write mode and toggling the second buffer memory between said write mode and said read mode respectively after said number of bits has been counted in step (f).

16. A method as in claim 15, in which:

each frame of data further includes information indicating said number of bits; and step (e) comprises computing said number of bits from said information.

17. A method as in claim 15, in which:

each frame comprises a header including subband allocation data; and step (e) comprises computing said number of bits from said subband allocation data.

18. A method as in claim 17, in which step (e) comprises the substeps of:

(h) decoding said header to obtain said subband allocation data; and (i) summing said subband allocation data to obtain said number of bits.

19. A method as in claim 12, in which:

step (a) comprises providing a first buffer memory having a capacity for storing no more than one subframe; and step (b) comprises providing a second buffer memory having a capacity for storing substantially one subframe.

20. A decoding system for decoding an MPEG input data bitstream including frames of data, each frame including a plurality of subframes of integrally encoded audio subband sample data, comprising:

a first buffer memory having a capacity for storing at least one subframe;

a second buffer memory having a capacity for storing at least one subframe;

a third buffer memory disposed upstream of the first and second buffer memories;

controller means for alternatingly storing subframes in the first buffer memory and the second buffer memory; and decoding means for reading out and decoding a subframe from the first buffer memory while the controller means stores another subframe in the second buffer memory.

21. A system as in claim 20, in which the third buffer memory has a capacity for storing at least one subframe.

22. A system as in claim 20, in which the controller means comprises:

computing means for computing a number of bits in one subframe;

counting means for counting bits of said bitstream; and toggling means for toggling the first buffer memory between a read mode and a write mode and toggling the second buffer memory between said write mode and said read mode respectively in response to the counter means counting said number of bits.

23. A system as in claim 22, in which:

the counting means loads said number of bits from the computing means in response to a reset condition, and is decremented by counting said bits; and the toggling means toggles the first and second buffer memories in response to the counting means being decremented to zero.

24. A system as in claim 23, in which each of the first and second buffer memories generates said reset condition in response to a subframe being read out thereof by the decoding means.

25. A system as in claim 24, in which:

said bitstream comprises a header for each frame including subband allocation data; and the computing means computes said number of bits from said subband allocation data.

26. A system as in claim 25, in which the computing means comprises:

header decoding means for decoding said header to obtain said subband allocation data; and summing means for summing said subband allocation data to obtain said number of bits.

27. A system as in claim 23, in which the decoding means generates said reset condition in response to completion of decoding a subframe.

28. A system as in claim 22, in which:

each frame of data further includes information indicating said number of bits; and the computing means computes said number of bits from said information.

29. A system as in claim 20, in which the first and second buffer memories each have a capacity for storing no more than one subframe.

* * * * *